(12) United States Patent
Takahashi

(10) Patent No.: US 8,128,293 B2
(45) Date of Patent: Mar. 6, 2012

(54) THRUST BEARING

(75) Inventor: Toshihiko Takahashi, Osaka (JP)

(73) Assignee: JTEKT Corporation, Osaka (JP)

( * ) Notice: Subject to any disclaimer, the term of this patent is extended or adjusted under 35 U.S.C. 154(b) by 101 days.

(21) Appl. No.: 12/787,466

(22) Filed: May 26, 2010

(65) Prior Publication Data
US 2010/0303401 A1 Dec. 2, 2010

(30) Foreign Application Priority Data

Jun. 2, 2009 (JP) ................................. 2009-133267
Apr. 27, 2010 (JP) ................................. 2010-102245

(51) Int. Cl.
*F16C 33/52* (2006.01)
(52) U.S. Cl. ........................................ 384/623; 384/574
(58) Field of Classification Search .................. 384/623, 384/574, 579, 614, 621
See application file for complete search history.

(56) References Cited

U.S. PATENT DOCUMENTS

| 2,057,213 | A | * | 10/1936 | Skyiepal | 384/623 |
| 2,267,708 | A | * | 12/1941 | Cox | 384/574 |
| 5,205,657 | A | * | 4/1993 | Feld | 384/621 |
| 5,269,609 | A | * | 12/1993 | Holtz et al. | 384/623 |
| 2006/0239601 | A1 | * | 10/2006 | Otaka et al. | 384/574 |

FOREIGN PATENT DOCUMENTS

JP A-2005-282714 10/2005
* cited by examiner

*Primary Examiner* — Thomas R Hannon
(74) *Attorney, Agent, or Firm* — Oliff & Berridge, PLC

(57) ABSTRACT

In a thrust bearing, an axially outer end portion of each pin of a pin-type retainer is fixed to an outside ring by a weld, and a threaded shaft, formed at an axially inner end portion of each pin, is screwed into a threaded hole formed in an inside ring. An inner peripheral surface of the inside ring slides on an outer peripheral surface of a rotary shaft, whereby the rotation of the pin-type retainer is guided.

3 Claims, 3 Drawing Sheets

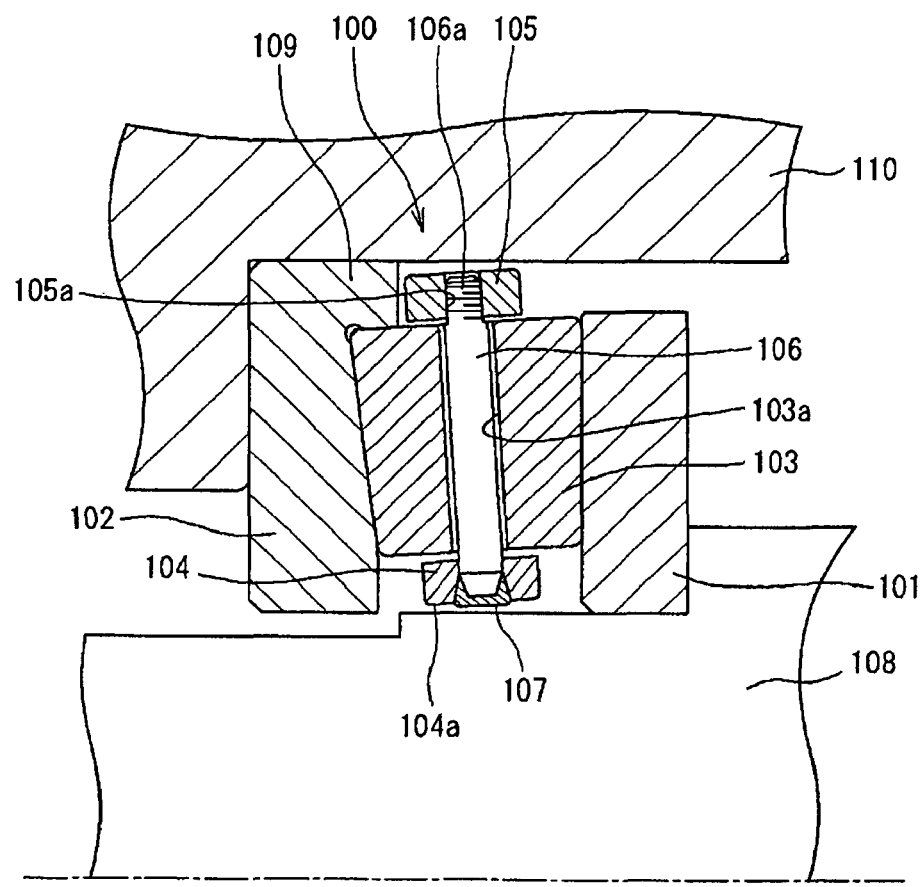

THRUST BEARING

INCORPORATION BY REFERENCE

The disclosure of Japanese Patent Applications No. 2009-133267 filed on Jun. 2, 2009 including the specification, drawings and abstract, is incorporated herein by reference in its entirety.

BACKGROUND OF THE INVENTION

1. Field of the Invention

The invention relates to a thrust bearing where multiple rolling elements are rollably arranged between an inner ring and an outer ring.

2. Description of the Related Art

In an existing art, for example, a thrust bearing for supporting a thrust load is used as a bearing that supports a main shaft of a crusher mill. The main shaft of the crusher mill rotates with respect to a housing. Such a thrust bearing is, for example, described in Japanese Patent Application Publication No. 2005-282714 (JP-A-2005-282714). The thrust bearing is a roller thrust bearing that is formed of an inner ring (shaft washer), an outer ring (housing washer), a plurality of tapered rollers, and a solid-type retainer. The inner ring is fitted to a rotary shaft. The outer ring is fitted to a housing. The tapered rollers are rollably arranged between the inner ring and the outer ring. The solid-type retainer has pockets for retaining the tapered rollers at predetermined intervals in the circumferential direction.

Because an extremely large thrust load acts on a roller thrust bearing that supports a main shaft of a crusher mill, the roller thrust bearing need to be provided with as many rollers as possible to have a higher loading capacity. Therefore, a pin-type retainer shown in FIG. 3 may be used. The pin-type retainer may be provided with more rollers than the solid-type retainer.

The pin-type retainer 100 includes a pair of inside ring 104 and outside ring 105, and pins 106. The inside ring 104 and the outside ring 105 are arranged at positions on respective sides of each tapered roller 103 in the axial direction of the tapered roller 103 and between an inner ring 101 and outer ring 102 of the roller thrust bearing. The pins 106 pass through through-holes 103a of the tapered rollers 103. Each pin 106 has a threaded shaft 106a at its one end. The threaded shaft 106a is screwed into a threaded hole 105a of the outside ring 105 that is arranged on the outer side of the tapered roller 103 in the axial direction of the tapered roller 103. The other end of each pin 106 is fixed by a weld 107 to an inner peripheral surface 104a of the inside ring 104 that is arranged on the inner side of the tapered roller 103 in the axial direction of the tapered roller 103.

In the pin-type retainer 100 shown in FIG. 3, because the other end of each pin 106 is fixedly welded to the inner peripheral surface 104a of the inside ring 104, the inner peripheral surface 104a may radially deform due to welding distortion, which deteriorates the out-of-roundness thereof. Therefore, as the rotation guide for the pin-type retainer 100, it is not possible to employ a shaft guide where the inner peripheral surface 104a of the inside ring 104 slides on the rotary shaft 108, and there is no other choice but to employ a roller guide where the tapered roller 103 guides the rotation of the pin-type retainer 100. The radial position of the tapered roller 103 is determined by a rib 109 of the outer ring 102. In the roller thrust bearing that supports the main shaft of the crusher mill, the axis of the rotary shaft 108 may largely offset from that of a housing 110 or the rotary shaft 108 may be inclined with respect to the housing 110. As a result, the axis of the inner ring 101 and the axis of the outer ring 102 may largely offset from each other, or a large offset load may be applied. If the axis of the rotary shaft 108 offset from the axis of the housing 110 or the rotary shaft 108 receives an offset load, the rotary shaft 108 may contact the inner peripheral surface 104a of the inside ring 104. If the rotary shaft 108 contacts the inner peripheral surface 104a of the inside ring 104 that is radially deformed due to welding distortion, the pin-type retainer 100 does not smoothly rotate, which causes a problem that the rotation performance of the roller thrust bearing decreases.

When the distance between the rotary shaft 108 and the inner peripheral surface 104a of the inside ring 104 is increased so that the rotary shaft 108 does not contact the inner peripheral surface 104a of the inside ring 104 even if the axis of the rotary shaft 108 largely offsets from the axis of the housing 110, it is necessary to reduce the length of each tapered roller 103. As a result, a loading capacity decreases.

SUMMARY OF THE INVENTION

The invention provides a thrust bearing of which the rotation performance is less likely to decrease.

An aspect of the invention relates to a thrust bearing that includes: a first raceway member that has an annular first raceway surface and of which an inner periphery is fitted to a shaft element; a second raceway member that has an annular second raceway surface facing the first raceway surface of the first raceway member in an axial direction and that is rotatable with respect to the first raceway member; a plurality of rolling elements that are rollably arranged between the first raceway surface of the first raceway member and the second raceway surface of the second raceway member; and a pin-type retainer that includes pins each passing through a corresponding one of the rolling elements concentrically with an axis of the rolling element, an outside ring that is arranged on an outer side of the rolling elements in an axial direction of the rolling elements and that is connected to one end portion of each of the pins, and an inside ring that is arranged on an inner side of the rolling elements in the axial direction of the rolling elements and that is connected to the other end portion of each of the pins. The one end portion of each of the pins is fixed to the outside ring by a weld and the other end portion of each of the pins is screwed to the inside ring. An inner peripheral surface of the inside ring serves as a guide surface that slides on the shaft element to guide rotation of the pin-type retainer.

With the thus configured thrust bearing, a shaft guide where the inside ring is used is employed as the rotation guide for the pin-type retainer. Thus, it is possible to prevent a decrease in the rotation performance of the thrust bearing.

BRIEF DESCRIPTION OF THE DRAWINGS

The foregoing and further objects, features and advantages of the invention will become apparent from the following description of an example embodiment with reference to the accompanying drawings, wherein like numerals are used to represent like elements and wherein:

FIG. 3 is a sectional view of an existing thrust bearing.

DETAILED DESCRIPTION OF EMBODIMENT

Figure 1:
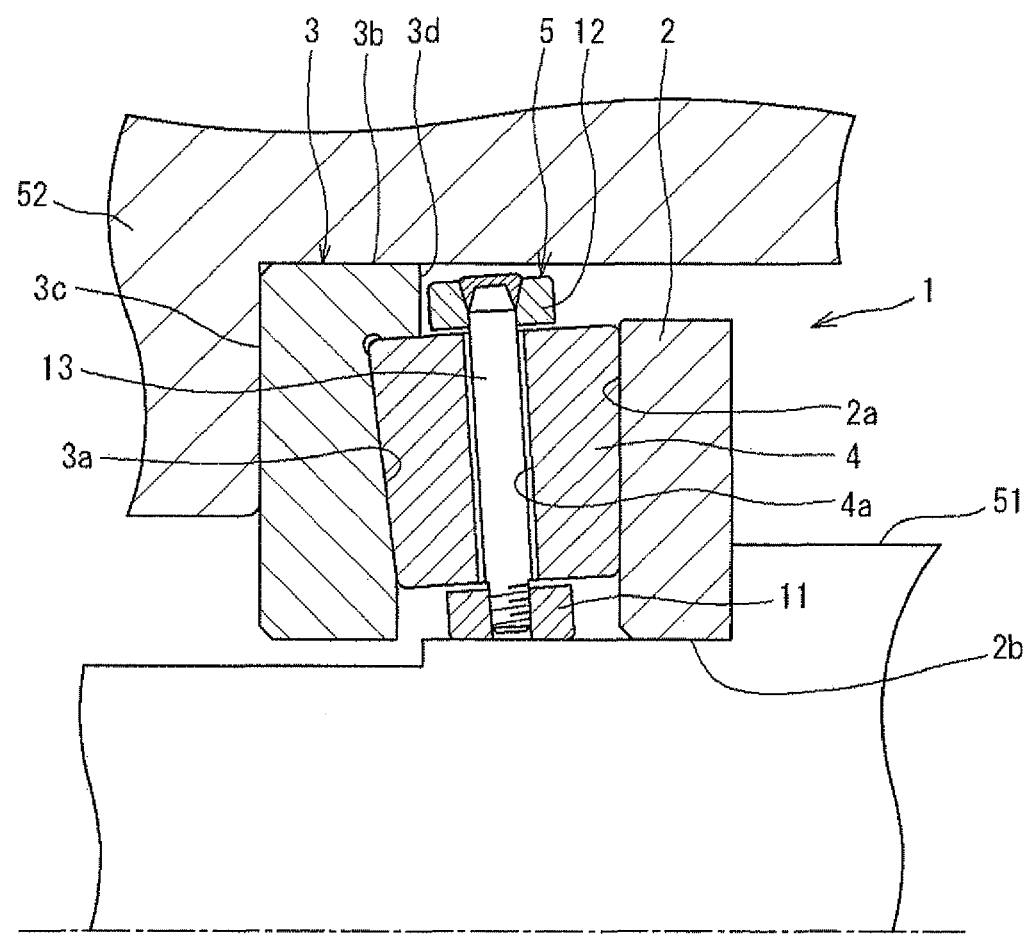
FIG. 1 is a sectional view of a thrust bearing according to an embodiment of the invention.

Next, an embodiment of the invention will be described with reference to the accompanying drawings. FIG. 1 is a sectional view of a thrust bearing according to the embodiment of the invention. The thrust bearing 1 is a roller thrust bearing that, for example, supports a rotary shaft (shaft element) 51 that is a main shaft of a crusher mill. More specifically, the thrust bearing 1 is a tapered roller thrust bearing. The thrust bearing 1 includes a first raceway member (inner ring) 2, a second raceway member (outer ring) 3, tapered rollers 4, and a pin-type retainer 5. The tapered rollers 4 are a plurality of rolling elements that are rollably arranged between the first raceway member 2 and the second raceway member 3. The pin-type retainer 5 is used to retain the tapered rollers 4 at predetermined intervals in the circumferential direction.

An inner peripheral surface 2b of the first raceway member 2 is fitted to the rotary shaft 51, and an end surface on the other side in the axial direction (right side in FIG. 1) is in contact with a step portion of the shaft element 51. A first raceway surface 2a is formed on an end surface on one side of the first raceway member 2 in the axial direction (left side in FIG. 1) so as to be perpendicular to the axis of the rotary shaft 51. The first raceway surface 2a is formed of an annular flat surface that allows the tapered rollers 4 to roll thereon.

An outer peripheral surface 3b of the second raceway member 3 is fitted to a housing 52, and an end surface 3c on one side in the axial direction (left side in FIG. 1) is in contact with a step portion of the housing 52. In addition, a second raceway surface 3a is formed on an end surface of the second raceway member 3 on the other side in the axial direction (right side in FIG. 1) so as to face the first raceway surface 2a in the axial direction. The second raceway surface 3a is formed of an annular tapered surface that allows the tapered rollers 4 to roll thereon. In addition, a rib portion 3d is formed at a radially outer side portion of the second raceway member 3. A large-diameter side end surface of each tapered roller 4 slides on the rib portion 3d to receive a load that is applied in the axial direction of the tapered roller 4.

Each tapered roller 4 is formed in a truncated cone shape, and is arranged in such a manner that the small-diameter side is located on a side adjacent to the rotary shaft 51 and the large-diameter side is located on a side adjacent to the housing 52. In addition, each tapered roller 4 has a through-hole 4a that extends along the axis.

The pin-type retainer 5 includes a plurality of pins 13, an annular inside ring 11 and an annular outside ring 12. The pins 13 pass through the through-holes 4a with gaps so as to be concentrical with the axes of the tapered rollers 4. The inside ring 11 is arranged on the inner side of the tapered rollers 4 in the axial direction of the tapered rollers 4, and the axially inner end portion of each pin 13 (the other end portion) is connected to the inside ring 11. The outside ring 12 is arranged on the outer side of the tapered rollers 4 in the axial direction of the tapered rollers 4, and the axially outer end portion of each pin 13 (one end portion) is connected to the outside ring 12.

Figure 2:
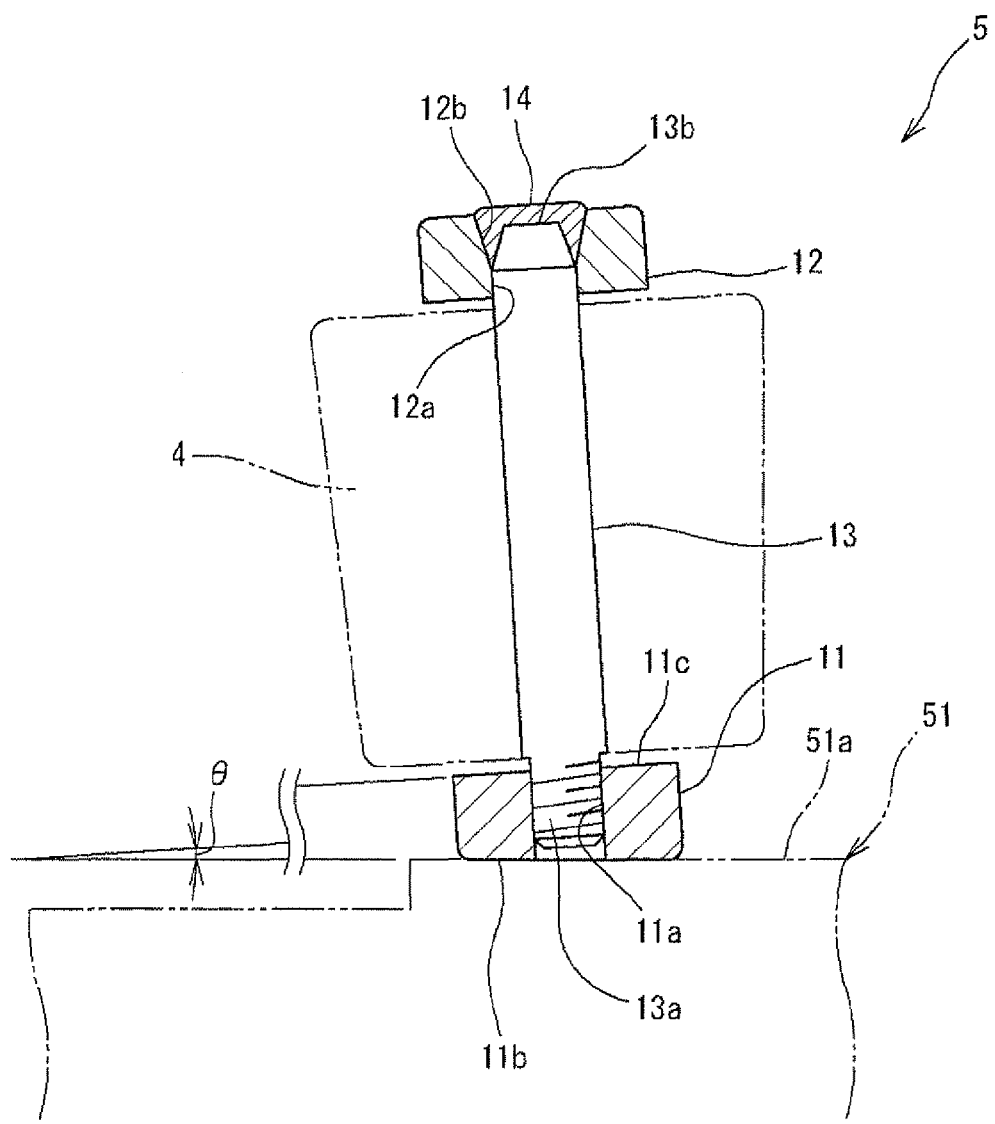
FIG. 2 is an enlarged sectional view of a pin-type retainer of the thrust bearing.

FIG. 2 is an enlarged sectional view of the pin-type retainer 5. The inside ring 11 is made of metal (for example, carbon steel for machine construction), and is arranged concentrically with the rotary shaft 51. The inside ring 11 has a plurality of threaded holes 11a at predetermined intervals in the circumferential direction. In addition, as shown in the sectional view of FIG. 2, the inner peripheral surface 11b of the inside ring 11 is inclined (at an inclination angle θ) with respect to the outer peripheral surface 11c so as to be parallel to the outer peripheral surface 51a of the rotary shaft 51. The inside diameter of the inner peripheral surface 11b of the inside ring 11 is larger than the outside diameter of the outer peripheral surface 51a of the rotary shaft 51. The distance between the inner peripheral surface of the annular outside ring 12 and the outer peripheral surface 11c of the annular inside ring 11 in the radial direction of the pin-type retainer 5 is larger than the length of each tapered roller 4 in the axial direction of the tapered roller 4. Thus, the inner peripheral surface 11b of the inside ring 11 slides on the outer peripheral surface 51a of the rotary shaft 51 while being in line contact with the outer peripheral surface 51a. Therefore, the inner peripheral surface 11b functions as a guide surface that guides the rotation of the pin-type retainer 5.

The outside ring 12 is made of metal (for example, carbon steel for mechanical construction). The outside ring 12 has an outside diameter larger than that of the inside ring 11, and is arranged concentrically with the inside ring 11. In addition, the outside ring 12 has a plurality of insertion holes 12a at predetermined intervals in the circumferential direction.

Each pin 13 rotatably supports the tapered roller 4, and has a threaded shaft 13a at its axially inner end portion. The threaded shaft 13a is screwed into the threaded hole 11a of the inside ring 11. Note that the threaded shaft 13a is formed to have such an axial length that an end surface on the axially inner side of the threaded shaft 13a does not project from the inner peripheral surface 11b of the inside ring 11 toward the rotary shaft 51. Therefore, the pins 13 do not inhibit the inner peripheral surface 11b of the inside ring 11 from guiding the rotation of the pin-type retainer 5.

The axially outer end portion 13b of each pin 13 is formed so that the outside diameter of the outer end portion 13b gradually decreases. The outer end portion 13b is inserted in the insertion hole 12a of the outside ring 12. The outer end portion of each insertion hole 12a has a welded portion 12b of which the hole diameter gradually increases. The outer end portion 13b of the pin 13 is fixed to the welded portion 12b of the outside ring 12 by a weld 14.

With the thus configured thrust bearing 1 according to the present embodiment, the outer end portion 13b of each pin 13 of the pin-type retainer 5 is fixed to the welded portion 12b of the outside ring 12 by the weld 14, and the inner end portion (threaded shaft 13a) of each pin 13 is screwed into the threaded hole 11a of the inside ring 11. Thus, it is possible to prevent the inner peripheral surface 11b of the inside ring 11 from deforming due to welding distortion. Thus, the inner peripheral surface 11b of the inside ring 11 may be used as a guide surface that slides on the rotary shaft 51 to guide the rotation of the pin-type retainer 5. Therefore, a shaft guide where the inner peripheral surface 11b of the inside ring 11 is used is employed as the rotation guide for the pin-type retainer 5. Thus, it is possible to prevent a decrease in the rotation performance of the thrust bearing 1. In addition, because the inner peripheral surface 11b of the inside ring 11 guides the rotation of the pin-type retainer 5 while being in contact with the outer peripheral surface 51 a of the rotary shaft 51, it is possible to prevent inclination of the pin-type retainer 5, and it is possible to further effectively guide the rotation of the pin-type retainer 5.

Note that the aspect of the invention is not limited to the embodiment described above. For example, a tapered roller thrust bearing is used as the thrust bearing 1; however, the thrust bearing 1 is not limited to the tapered roller thrust bearing. The thrust bearing 1 may be applied to another typical roller thrust bearing, such as a cylindrical roller thrust bearing. In addition, in the above embodiment, the thrust bearing is a roller thrust bearing; instead, the thrust bearing may be a ball thrust bearing of which rolling elements are balls. In addition, the rotary shaft 51 of the crusher mill is illustrated as the shaft element; instead, the shaft element may be a pivotal shaft that pivots only within a predetermined angle.

The invention claimed is:

1. A thrust bearing comprising:
a first raceway member that has an annular first raceway surface and of which an inner periphery is fitted to a shaft element;
a second raceway member that has an annular second raceway surface facing the first raceway surface of the first raceway member in an axial direction and that is rotatable with respect to the first raceway member;
a plurality of rolling elements that are rollably arranged between the first raceway surface of the first raceway member and the second raceway surface of the second raceway member; and
a pin-type retainer that includes pins each passing through a corresponding one of the rolling elements concentrically with an axis of the rolling element, an outside ring that is arranged on an outer side of the rolling elements in an axial direction of the rolling elements and that is connected to one end portion of each of the pins, and an inside ring that is arranged on an inner side of the rolling elements in the axial direction of the rolling elements and that is connected to the other end portion of each of the pins, wherein
the one end portion of each of the pins is fixed to the outside ring by a weld and the other end portion of each of the pins is screwed to the inside ring, and
an inner peripheral surface of the inside ring serves as a guide surface that slides on the shaft element to guide rotation of the pin-type retainer.

2. The thrust bearing according to claim 1, wherein the guide surface is in line contact with the shaft element.

3. The thrust bearing according to claim 1, wherein each of the rolling elements is a roller, and the thrust bearing is a roller thrust bearing.

\* \* \* \* \*